United States Patent
Yeh et al.

(10) Patent No.: US 6,292,012 B1
(45) Date of Patent: Sep. 18, 2001

(54) DEVICE FOR PROTECTING A PROGRAMMABLE NON-VOLATILE MEMORY

(75) Inventors: Tsuei-Chi Yeh, Hsinchu; Chung Hsun Ma, Taipei Hsien, both of (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/447,602

(22) Filed: Nov. 23, 1999

(30) Foreign Application Priority Data

Oct. 6, 1999 (TW) .................................. 88117221

(51) Int. Cl.[7] .............................. H03K 19/00; G06F 12/16
(52) U.S. Cl. .................................. 326/8; 326/37; 711/163
(58) Field of Search .......................... 326/38, 37, 39–41, 326/46, 47, 8; 711/163

(56) References Cited

U.S. PATENT DOCUMENTS 5,119,336 * 6/1992 Itoh ...................................... 368/195
5,721,872 * 2/1998 Katsuta .............................. 711/163

FOREIGN PATENT DOCUMENTS

363310214A * 12/1988 (JP) .

* cited by examiner

*Primary Examiner*—Michael Tokar
*Assistant Examiner*—James H. Cho
(74) *Attorney, Agent, or Firm*—Jiawei Huang; J. C. Patents

(57) ABSTRACT

A device installed in a computer system for protecting the program or data inside a programmable non-volatile memory. The device includes a first and a second combinatorial logic circuit, a delay circuit, a low-enable latching device with reset capability, an AND gate and a memory cell array. As soon as all the necessary system startup operations dictated by the BIOS program inside the memory cell array are executed and a specified memory read/write program that matches the preset internal parameters of a logic circuit is activated so that output from the AND gate is a logic 'false', the memory cell array is permanently locked in a non-programmable state, unless the power is turned off and then restarted again. There is no way for any software program to change the programming state of the memory cell array back to a re-programming state again. Hence, the device is an effective means of protecting the programs inside the memory from illegal tampering.

10 Claims, 2 Drawing Sheets

DEVICE FOR PROTECTING A PROGRAMMABLE NON-VOLATILE MEMORY

CROSS-REFERENCE TO RELATED APPLICATION

This application claims the priority benefit of Taiwan application serial no. 88117221, filed Oct. 06, 1999.

BACKGROUND OF THE INVENTION

1. Field of Invention

The present invention relates to a mechanism that controls the reprogramming of memory. More particularly, the present invention relates to a device capable of preventing the loss of data from programmable non-volatile memory due to illegally tampering or reprogramming.

2. Description of Related Art

To satisfy the need for plug and play function, the basic input/output system (BIOS) program for starting a personal computer (PC) is stored inside a programmable non-volatile memory. In fact, programmable non-volatile memory such as electrical erasable programmable read only memory (EEPROM) or flash ROM is used as a storage medium because stored data can be retained after power is cut off. New data can still be written into the memory, if necessary, however, due to the re-programmable capability, the BIOS program is an easy target for corruption through a computer virus attack. Once data within the BIOS program is erased or changed, the computer can start only with difficulty. The cost of recovering from the damage caused by a virus attack is usually very high. Moreover, data within the BIOS is very much dependent upon the type of computer. Hence, a universal solution to the problem is difficult to find.

FIG. 1 is a block diagram showing a conventional re-programming control mechanism for a flash ROM. In fact, most programmable non-volatile memory also employs the same type of re-programming mechanism. In FIG. 1, the flash memory 10 includes a combinatorial logic circuit 12 and a flash memory cell array 14. Lines having the labels $I_{0}$–$I_{0n}$ represent the input signal to the combinatorial logic circuit 12. These are the memory write enable signals. In other words, these are the internal signals for reprogramming control.

When the input signals $I_{0}$–$I_{0n}$ picked up by the combinatorial logic circuit 12 match a set of internal parameters, the combinatorial logic circuit 12 issues a logic 'true' output signal on the memory write enable MWE line. Conversely, if the input signals $I_{0}$–$I_{0n}$ picked up by the combinatorial logic circuit 12 do not match the set of internal parameters, a logic 'false' signal is issued on the memory write enable MWE line. As soon as the flash memory cell array 14 receives a logic 'true' signal from the memory write enable MWE line, the flash memory cell array 14 can be re-programmed. However, if the flash memory cell array 14 receives a logic 'false' signal from the MWE line, re-programming of the flash memory cell array 14 is not allowed. In the above description, a logic 'true' may mean either a high potential '1' or a low potential '0' depending on the design.

With the aforementioned circuit arrangement, any software programmer knowing the set of internal parameters of the combinatorial logic circuit 12 can re-program the flash memory cell array 14 in whatever ways desired. Consequently, corruption of the BIOS program inside the memory is possible.

SUMMARY OF THE INVENTION

The present invention provides a device capable of preventing the loss of data from programmable non-volatile memory due to illegal tampering or reprogramming.

To achieve these and other advantages and in accordance with the purpose of the invention, as embodied and broadly described herein, the invention provides a device capable of protecting the pro gram data inside a programmable non-volatile memory. The device includes a first and a second combinatorial logic circuit, a delay circuit, a low-enable latching device with reset capability, an AND gate and a memory cell array. In the device of the invention, when all the necessary system startup operations dictated by the BIOS program inside the memory cell array are executed and a specified memory read/write program that matches the preset internal parameters of a logic circuit is activated, the memory cell array is permanently locked in a non-programmable state unless the power of the device is turned off and then restarted. There is no way for any software program to change the programming state of the memory cell array back to a re-programming state again. Hence, the device is an effective means of protecting the programs inside the memory from illegal tampering.

In the device of the invention, the input terminals of the first combinatorial logic circuit receives a first set of input signals while the input terminals of the second combinatorial logic circuit receives a second set of input signals. The output terminal of the first combinatorial logic circuit are used for issuing a memory write enable signal, whereas the output terminal of the second combinatorial logic circuit are used for issuing a reset signal. The input terminal of the delay circuit is coupled to a source voltage while the output terminal is used for issuing an enable signal. The input terminals of the low-enable latching device is coupled to a source voltage and the output terminal of the delay circuit, respectively. The control terminal of the low-enable latching device is coupled to the output terminal of the second combinatorial logic circuit. The output terminal of the low-enable latching device issues an output signal. The input terminals of the AND gate are coupled to the output terminal of the first combinatorial logic circuit and the output terminal of the low-enable latching device, respectively. The output terminal of the AND gate issues a memory re-program control signal. The memory cell array is a device for storing programs or data. The memory cell array is coupled to the output terminal of the AND gate. In operation, when the first and the second set of input signals sent to the first and the second combinatorial logic circuit both match their respective preset internal parameters, the first and the second combinatorial logic circuit send out a logic 'true' signal on the memory write enable line and the reset line, respectively. On the other hand, when the first and the second set of input signals sent to the first and the second combinatorial logic circuit do not match their respective preset internal parameters, the first and the second combinatorial logic circuit send out a logic 'false' signal on the memory write enable line and the reset line, respectively. As long as the memory re-program control signal receives a logic 'false' signal, nothing can be programmed into the memory cell array. In contrast, if the memory re-program control signal receives a logic 'true' signal, re-programming of the memory cell array is allowed. The invention dictates that as long as the BIOS program within the memory cell array is executed and specified memory read/write procedures for matching the preset internal parameters of the second combinatorial logic circuit are activated so that a logic 'false' signal is issued from the output terminal of the AND gate, the memory cell array is locked up in a non-reprogrammable state unless the power is turned off and then restarted. Once in the non-programmable state, software programs can no longer change the non-programming status and tamper with the original program code. Hence, illegal re-programming is prevented.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
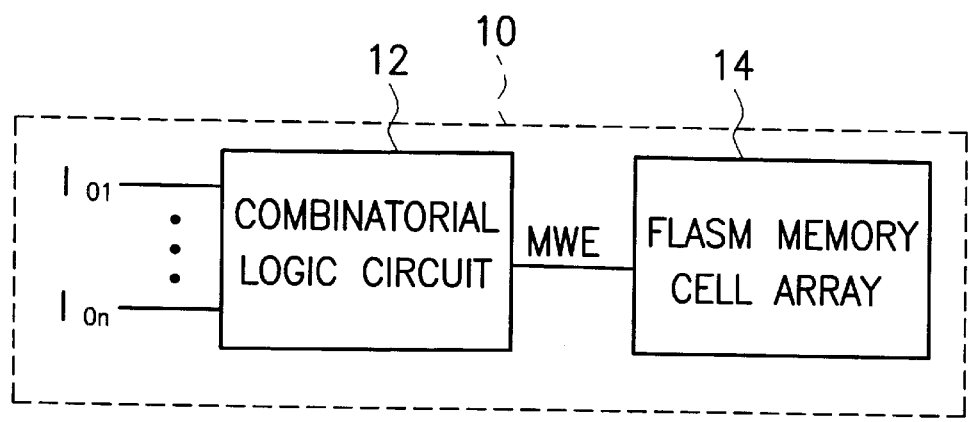
FIG. 1 is a block diagram showing a conventional re-programming control mechanism for a flash ROM.

Reference will now be made in detail to the present preferred embodiments of the invention, examples of which are illustrated in the accompanying drawings. Wherever possible, the same reference numbers are used in the drawings and the description to refer to the same or like parts.

To prevent the BIOS program inside a computer system from malicious reprogramming or virus attack, this invention provides a device capable of protecting data stored inside a programmable non-volatile type of memory. The following is a description of the device, using a flash ROM as an example of the memory to be protected.

Figure 2:
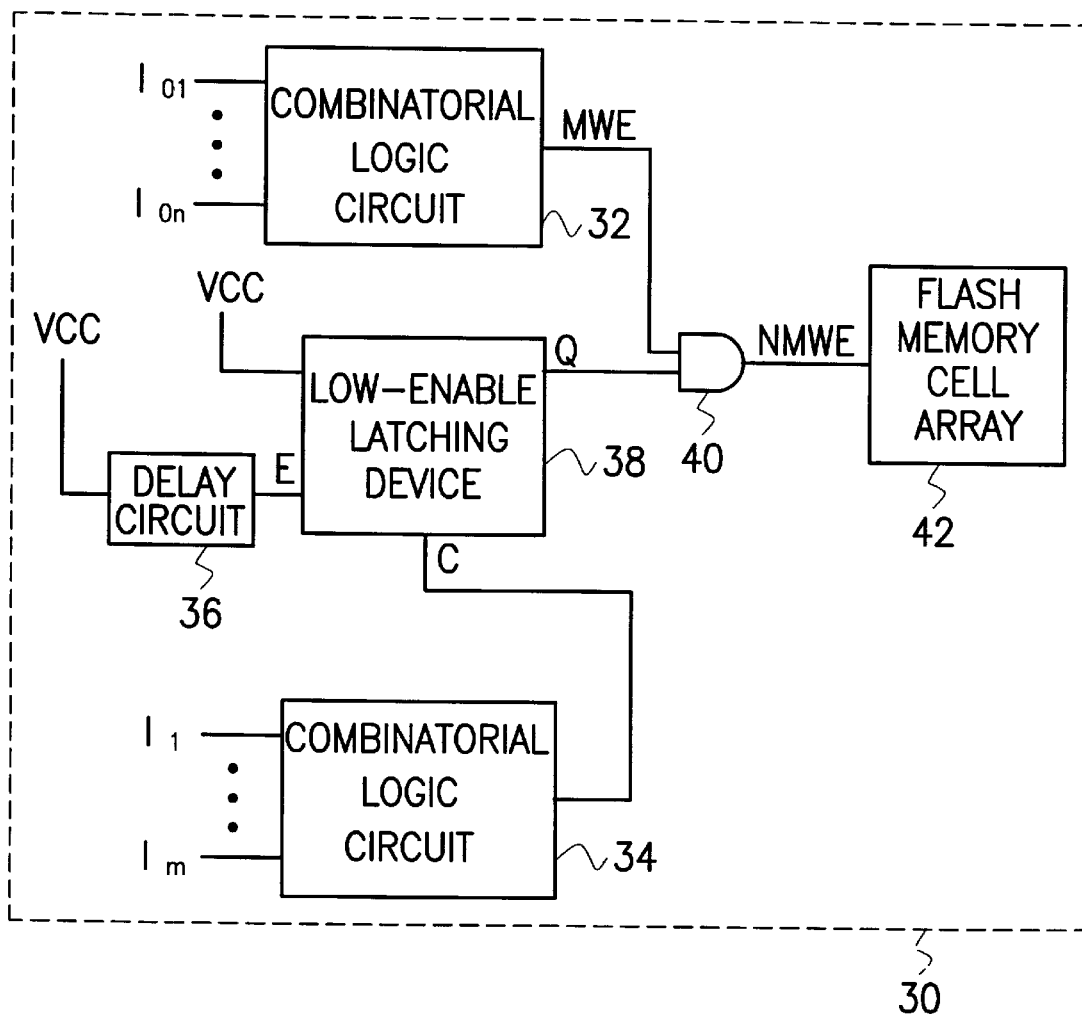
FIG. 2 is a block diagram showing a re-programming control mechanism for a flash ROM according to a first preferred embodiment of this invention.

FIG. 2 is a block diagram showing a re-programming control mechanism for a flash ROM according to a first preferred embodiment of this invention.

In the first embodiment of this invention, the re-programming control mechanism 30 for protecting the flash ROM includes two combinatorial logic circuits 32 and 34, a delay circuit 36, a low-enable latching device 38 with reset capability, an AND gate 40 and a flash memory cell array 42. The delay circuit 36 can be formed, for example, by connecting a plurality of flip-flops in series.

The input terminals of the first combinatorial logic circuit 32 receive a plurality of input signals $I_{0}$–$I_{0n}$, respectively. The output terminal of the circuit 32 issues a memory write enable signal MWE. The input terminals of the second combinatorial logic circuit 34 receive a plurality of input signals $I_r$–$I_m$. The output terminal of the circuit 34 issues a reset signal C. The input terminal of the delay circuit 36 is coupled to a source voltage VCC while its output terminal issues an enable signal E. The input terminals of the low-enable latching device 38 are coupled to a source voltage VCC and the output terminal of the delay circuit 36, respectively. The control terminal of the low-enable latching device 38 is connected to the output terminal of the logic circuit 34, while the output terminal of the low-enable latching device 38 issues a signal Q. The input terminals of the AND gate are connected to the output terminal of the logic circuit 32 and the low-enable latching device 38, respectively. The output terminal of the AND gate issues a memory re-program control signal NMWE to the flash memory cell array 42. The re-program control signal NMWE is an internal signal for controlling the re-programming of the flash memory.

When the input signals $I_{0}$–$I_{0n}$ picked up by the logic circuit 32 match its preset internal parameters, the logic circuit 32 outputs a 'true' signal on the memory enable signal line MWE. On the other hand, if the input signals $I_{0}$–$I_{0n}$ picked up by the logic circuit 32 do not match its preset internal parameters, the logic circuit 32 outputs a 'false' signal on the memory enable signal line MWE. Similarly, when the input signals $I_r$–$I_m$ picked up by the logic circuit 34 match its preset internal parameters, the logic circuit 34 outputs a 'true' signal on the reset signal line C. Conversely, if the input signals $I_r$–$I_m$ picked up by the logic circuit 34 do not match its preset internal parameters, the logic circuit 34 outputs a 'false' signal on the reset signal line C. A logic 'true' signal can be either a high potential '1' or a low potential '0', depending on design.

Just after the system is powered on, since input signals $I_r$–$I_m$ do not match the preset internal parameters within the logic circuit 34, a 'false' signal is output to the reset line C. Hence, the low-enable latching device 38 is not activated. In the meantime, the high source voltage VCC arrives at the low-enable latching device 38 after a period of delay in the delay circuit 36. On arrival of the delayed signal, the enable signal line E is disabled so that a logic 'true' signal is latched onto the output line Q of the low-enable latching device 38. The memory re-program control signal NMWE now depends only on the memory write enable signal MWE. In other words, the flash memory cell array 42 is in a re-programmable state ready for re-programming.

As soon as the BIOS program has executed every step necessary to initialize the system at startup, a specified memory read/write program can be activated in order to match the preset internal parameters inside the logic circuit 34. Ultimately, the logic circuit 34 issues a 'true' signal via the reset line C so that the low-enable latching device 38 is reset. Hence, the output signal line Q of the low-enable latching device 38 is permanently latched to a logic 'false' signal. Consequently, a logic 'false' signal is permanently put on the output terminal of the AND gate 40, and the signal on the NMWE line is a logic 'false' all the time. That is, the flash memory cell array 42 remains in a non-programmable state until the power source is switched off and then back on again.

In other words, after all the necessary system startup operations dictated by the BIOS program inside the memory cell array are executed and a specified memory read/write program that matches the preset internal parameters of the logic circuit 34 is activated so that a logic 'false' signal is output from the AND gate 40 via the NMWE line, the memory cell array 42 is locked permanently in a non-programmable state. There is no way for any software program to change the programming state of the memory cell array 42 back to a re-programming state again. Therefore, the device is an effective means of protecting the stored program inside the memory cell array 42.

Figure 3:
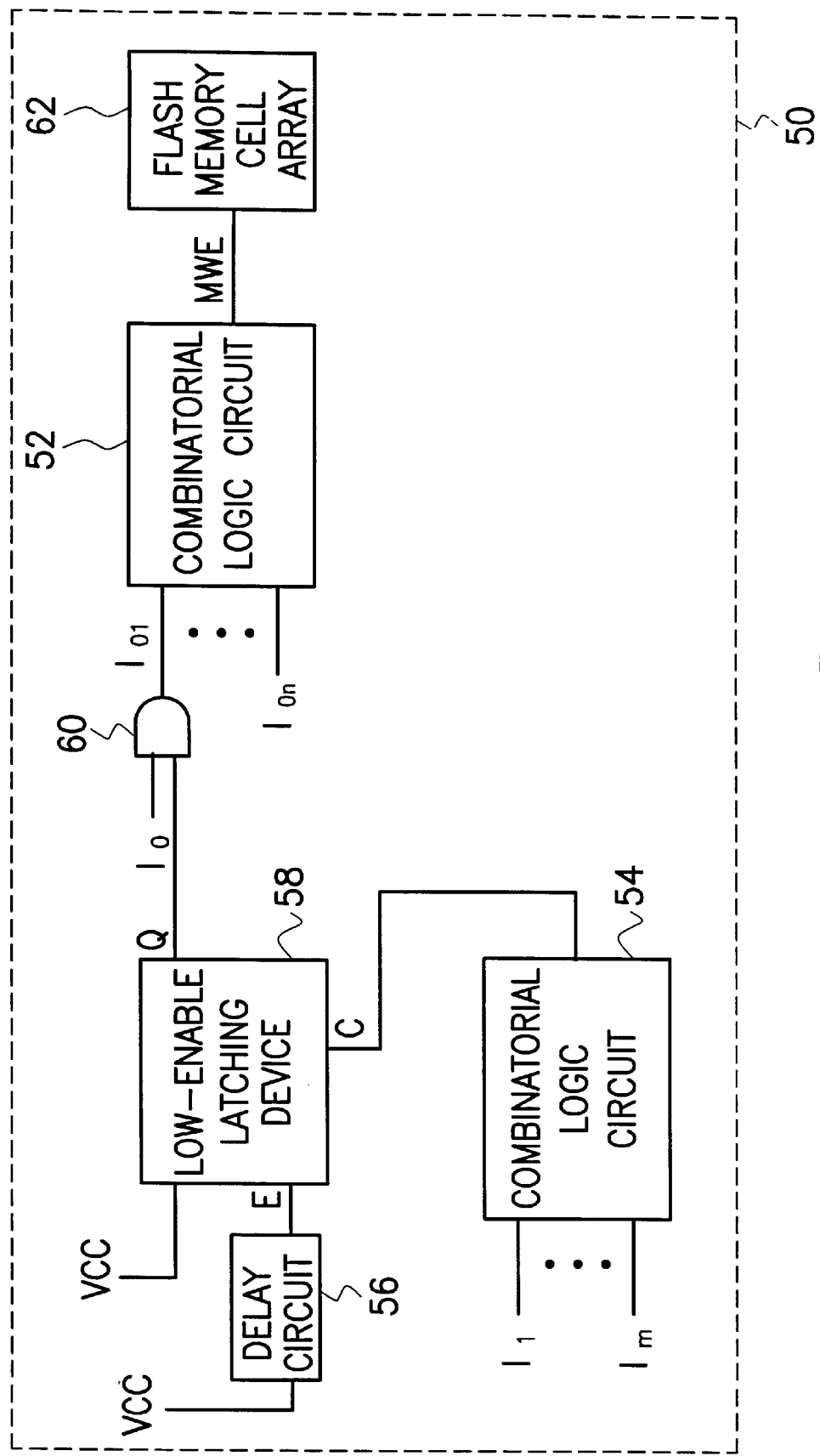
FIG. 3 is a block diagram showing a re-programming control mechanism for a flash ROM according to a second preferred embodiment of this invention.

FIG. 3 is a block diagram showing a re-programming control mechanism for a flash ROM according to a second preferred embodiment of this invention.

In the second embodiment of this invention, the re-programming control mechanism 50 for protecting the flash ROM includes two combinatorial logic circuits 52 and 54, a delay circuit 56, a low-enable latching device 58 with reset capability, an AND gate 60 and a flash memory cell array 62. The delay circuit 56 can be formed, for example, by connecting a plurality of flip-flops together in series.

The input terminals of the first combinatorial logic circuit 54 receive a plurality of input signals $I_1$–$I_m$, respectively. The output terminal of the circuit 54 issues a reset signal C. The input terminal of the delay circuit 56 is coupled to a source voltage VCC while its output terminal issues an enable signal E. The input terminals of the low-enable latching device 58 are coupled to a source voltage VCC and the output terminal of the delay circuit 56, respectively. The control terminal of the low-enable latching device 38 is connected to the output terminal of the logic circuit 54, while the output terminal of the low-enable latching device 38 issues a signal Q. The input terminals of the second combinatorial logic circuit 52 receive a plurality of input signals $I_{01}$–$I_{0n}$, respectively. The output terminal of the circuit 52 issues a memory write enable signal MWE to the flash memory cell array 62. The memory write enable signal MWE is an internal signal for controlling the re-programming of the flash memory. The input terminals of the AND gate 60 are coupled to the output terminal of the low-enable latching device 58 and an external input terminal for an input signal $I_o$, respectively. The output terminal of the AND gate 60 is coupled to one of the input terminals of the second combinatorial logic circuit 52, for example, a terminal for the input signal $I_{0l}$. When the input signals $I_{01}$–$I_{0n}$ picked up by the logic circuit 52 match its preset internal parameters, the logic circuit 52 issues a 'true' signal on the memory enable signal line MWE. On the other hand, if the input signals $I_{01}$–$I_{0n}$ picked up by the logic circuit 52 do not match its preset internal parameters, the logic circuit 52 issues a 'false' signal on the memory enable signal line MWE. Similarly, when the input signals $I_1$–$I_m$ picked up by the logic circuit 54 match its preset internal parameters, the logic circuit 54 issues a 'true' signal on the reset signal line C. Conversely, if the input signals $I_1$–$I_m$ picked up by the logic circuit 54 do not match its preset internal parameters, the logic circuit 54 issues a 'false' signal on the reset signal line C. A logic 'true' signal can be either a high potential '1' or a low potential '0' depending on design.

Just after the system is powered on, since input signals $I_1$–$I_m$ do not match the preset internal parameters within the logic circuit 54, a 'false' signal is output to the reset line C. Hence, the low-enable latching device 58 is not activated. In the meantime, the high source voltage VCC arrives at the low-enable latching device 58 after a period of delay in the delay circuit 56. On arrival of the delayed signal, the enable signal line E is disabled so that a logic 'true' signal is latched onto the output line Q of the low-enable latching device 58. The issue of a memory write enable signal MWE now depends on the variation of external input signal $I_0$. In other words, the flash memory cell array 62 is in a re-programmable state ready for re-programming.

As soon as the BIOS program has executed every step necessary to initialize the system at startup, a specified memory read/write program can be activated in order to match the preset internal parameters inside the logic circuit 54. Ultimately, the logic circuit 54 issues a 'true' signal via the reset line C so that the low-enable latching device 58 is reset. Hence, the output signal line Q of the low-enable latching device 58 is permanently latched to a logic 'false' signal. Consequently, a logic 'false' signal is permanently issued on the output terminal of the AND gate 60 or the terminal for input signal $I_{0l}$, and the signal on the MWE line will be a logic 'false' all the time. That is, the flash memory cell array 62 remains in a non-programmable state until the power source is switched off and then back on again.

In other words, after all the necessary system startup operations dictated by the s BIOS program are executed and a specified memory read/write program that matches the preset internal parameters of the logic circuit 54 is activated so that a logic 'false' signal is output from the AND gate 60 to one of the input terminals of the logic circuit 52, a logic 'false' signal is issued on the MWE line, permanently locking the memory cell array 62 in a non-programmable state. There is no way for any software program to change the programming state of the memory cell array 62 back to a re-programming state again. Therefore, the device is an effective means of protecting the stored program inside the memory cell array 62.

In summary, the advantages of the device of this invention is that as soon as all the necessary system startup operations dictated by the BIOS program are executed and a specified memory read/write program that matches the preset internal parameters of a logic circuit is activated so that output from the AND gate is a logic 'false', the memory cell array is permanently locked in a non-programmable state. There is no way for any software program to change the programming state of the memory cell array back to a re-programming state again. Hence, the device is an effective means of protecting the programs inside the memory from illegal tampering.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A device for preventing loss of data from a programmable non-volatile memory, comprising:

a first combinatorial logic circuit with a plurality of input terminals for receiving a first set of input signals and an output terminal for issuing a memory write enable signal;

a second combinatorial logic circuit with a plurality of input terminals for receiving a second set of input signals and an output terminal for issuing a reset signal;

a delay circuit with an input terminal coupled to a source voltage and an output terminal for issuing an enable signal;

a low-enable latching device with reset capability, wherein the low-enable latching device has two input terminals, a control terminal and an output terminal, the input terminals are coupled to the source voltage and the output terminal of the delay circuit, respectively, the control terminal is coupled to the output terminal of the second combinatorial logic circuit and the output terminal is used for issuing an output signal;

an AND gate whose input terminals are coupled to the output terminal of the first combinatorial logic circuit and the low-enable latching device, respectively, and whose output terminal is used for issuing a memory re-program control signal; and a memory cell array coupled to the output terminal of the AND gate for storing program code;

wherein when the first and the second set of input signals received by the respective first and second combinatorial logic circuit match their preset internal parameters, a logic 'true' signal is issued on the memory write enable signal line and the reset signal line by the respective first and second logic circuit, and when the first and the second set of input signals received by the respective first and second combinatorial logic circuit do not match their preset internal parameters, a logic 'false' signal is issued on the memory write enable signal line and the reset signal line by the respective first and second logic circuit, such that when the memory re-program control signal line receives a logic 'false' signal, the memory cell array is in a non-programmable state, and conversely, when the memory re-program control signal line receives a logic 'true' signal, the memory cell array is in a programmable state.

2. The device of claim 1, wherein the delay circuit includes a plurality of serially connected flip-flops.

3. The device of claim 1, wherein a logic 'true' signal implies a high potential or a logic '1' while a logic 'false' signal implies a low potential or logic '0'.

4. The device of claim 1, wherein the programmable non-volatile memory includes flash ROM.

5. The device of claim 1, wherein the memory cell array includes a flash memory cell array.

6. A device for preventing the loss of data from a programmable non-volatile memory, comprising:

a first combinatorial logic circuit with a plurality of input terminals for receiving a first set of input signals and an output terminal for issuing a memory write enable signal;

a second combinatorial logic circuit with a plurality of input terminals for receiving a second set of input signals and an output terminal for issuing a reset signal;

a delay circuit with an input terminal coupled to a source voltage and an output terminal for issuing an enable signal;

a low-enable latching device with reset capability, wherein the low-enable latching device has two input terminals, a control terminal and an output terminal, the input terminals are coupled to the source voltage and the output terminal of the delay circuit, respectively, the control terminal is coupled to the output terminal of the second combinatorial logic circuit and the output terminal is used for issuing an output signal;

an AND gate whose input terminals are coupled to the output terminal of the low-enable latching device and an external signal input terminal, respectively, and whose output terminal is coupled to one of the input terminals of the first combinatorial logic circuit; and a memory cell array coupled to the output terminal of the first combinatorial logic circuit for storing program code, when the first and the second set of input signals received by the respective first and second combinatorial logic circuit match their preset internal parameters, a logic 'true' signal is put on the memory write enable signal line and the reset signal line by the respective first and second logic circuit, and when the first and the second set of input signals received by the respective first and second combinatorial logic circuit do not match their preset internal parameters, a logic 'false' signal is put on the memory write enable signal line and the reset signal line by the respective first and second logic circuit, such that when the memory write enable signal line receives a logic 'false' signal, the memory cell array is in a non-programmable state, and conversely, when the memory write enable signal line receives a logic 'true' signal, the memory cell array is in a programmable state.

7. The device of claim 6, wherein the delay circuit includes a plurality of serially connected flip-flops.

8. The device of claim 6, wherein a logic 'true' signal implies a high potential or a logic '1' while a logic 'false' signal implies a low potential or logic '0'.

9. The device of claim 6, wherein the programmable non-volatile memory includes flash ROM.

10. The device of claim 6, wherein the memory cell array includes a flash memory cell array.

* * * * *